(No Model.)

L. M. DEVORE.
HANDLE.

No. 525,189. Patented Aug. 28, 1894.

Witnesses:
Charles Shewey
A. H. Ebbesen

Inventor:
Levi M. Devore,
by Miles Greuer Bither
Attorneys

UNITED STATES PATENT OFFICE.

LEVI M. DEVORE, OF FREEPORT, ILLINOIS, ASSIGNOR OF ONE-HALF TO M. H. WILCOXON, OF SAME PLACE.

HANDLE.

SPECIFICATION forming part of Letters Patent No. 525,189, dated August 28, 1894.

Application filed May 1, 1893. Serial No. 472,580. (No model.)

*To all whom it may concern:*

Be it known that I, LEVI M. DEVORE, a citizen of the United States of America, residing at Freeport, in the county of Stephenson and State of Illinois, have invented certain new and useful Improvements in Handles, of which the following is a specification.

My invention relates to improvements in handles of that class in which the handle and its shank are formed from a single metal rod, that portion of the rod making up the handle, being so bent as to give the handle a suitable shape adapting it to be easily grasped and firmly held.

The invention is fully described and explained in this specification and shown in the accompanying drawings, in which—

Figure 1:
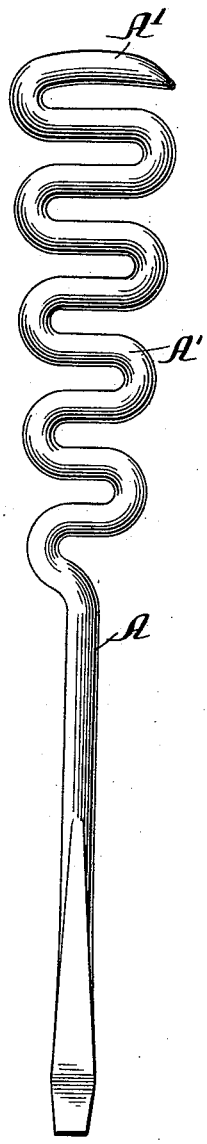
Figure 2:
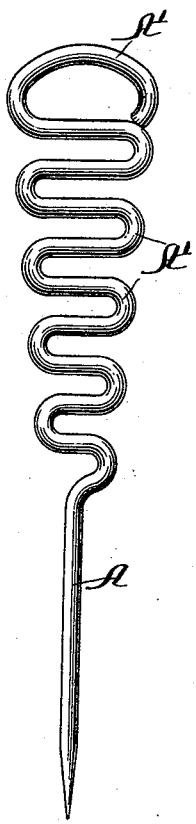

Figure 1 shows a screw-driver formed from a single rod and having a handle embodying my invention. Fig. 2 shows an awl having a slightly different handle; and Fig. 3 shows another slightly different form of my invention.

In the views, A is a shank formed from a preferably round rod of metal and having at one end a handle made up of a series of transverse serpentine bends, A', A', lying in the same plane and of such transverse lengths as to give the handle a convenient general outline. The transverse limbs of each bend are preferably straight and approximately parallel to each other with the exception of the one farthest from the shank, which is preferably curved to afford a better surface for the pressure of the hand against the end of the handle.

Figure 3:
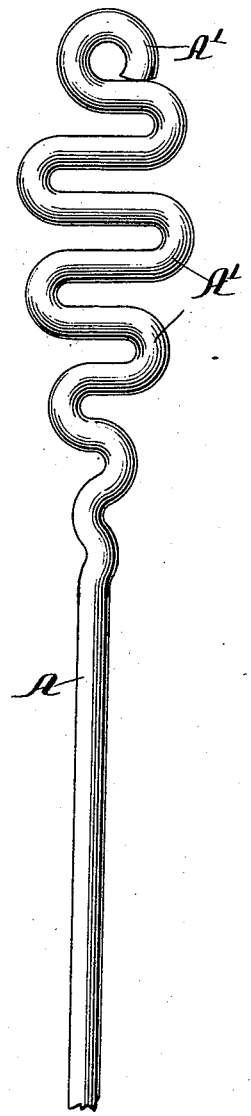

The relative lengths of the respective transverse bends may be varied as desired for the purpose of changing the outline of the handle, it being desirable for some purposes to make the handle of gradually increasing width from the shank to the end of the handle as shown in Figs. 1 and 2, or in other instances to make the longest bend near the middle of the handle for the purpose of making the handle widest at its center as shown in Fig. 3.

The terminal bend of the handle may be curved only enough to give it a convex external edge as shown in Fig. 1, or it may be turned back upon the next preceding bend to form a closed loop as shown in Figs. 2 and 3. So far as the ordinary use of the handle is concerned, this difference in construction is not material, but it is a convenience to form the end of the handle with a closed loop by which the handle may be suspended.

The handle thus formed is light, strong, cheap and easy to construct and is of such shape as to be grasped conveniently and securely in the hand. It is extremely rigid and resists pressure tending to bend or twist it, to a degree which makes it extremely serviceable and durable. When used as a part of a tool of any kind for mechanical use, the form of the handle is frequently convenient for the reason that it may be used for drawing nails, one of the bends of the handle being slipped laterally upon the nail to be drawn, so that the two limbs of the bend embrace it, and the entire tool being used as a lever for lifting the nail out of its place.

I am aware that it has been proposed to form a shank and handle from a single rod or wire, a portion of the rod being bent upon itself to form the handle, and its end being wrapped about the shank. The present invention is however wholly different in that both ends of the rod are free and lie at opposite ends of the completed tool. Its construction consists wholly in forming a series of simple lateral bends, no wrapping or twisting being required. It is therefore extremely inexpensive, and I have found in actual use that it has all necessary strength and rigidity.

Having now described and explained my invention, what I claim as new, and desire to secure by Letters Patent, is—

A one-piece handle and shank consisting of a rod, of substantially uniform diameter, having one end portion straight, to serve as a shank, and the other or succeeding portion carried back and forth in one plane to approximately equal distances upon opposite sides of the axial line of the shank, to form a broad flat handle.

LEVI M. DEVORE.

Witnesses:
CHARLES O. SHERVEY,
A. I. H. EBBESEN.